(12) United States Patent
Simon

(10) Patent No.: US 8,237,444 B2
(45) Date of Patent: Aug. 7, 2012

(54) ELECTROMAGNETIC LOGGING APPARATUS AND METHOD

(75) Inventor: Matthieu Simon, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 553 days.

(21) Appl. No.: 12/423,501

(22) Filed: Apr. 14, 2009

(65) Prior Publication Data

US 2009/0309601 A1  Dec. 17, 2009

(30) Foreign Application Priority Data

Apr. 16, 2008  (EP) .................................... 08154658

(51) Int. Cl.
*G01V 3/26* (2006.01)
*G01V 3/30* (2006.01)

(52) U.S. Cl. ........................ 324/338; 324/441
(58) Field of Classification Search .......... 324/323–375; 702/6–8, 11, 13
See application file for complete search history.

(56) References Cited

U.S. PATENT DOCUMENTS

| | | | | |
|---|---|---|---|---|
| 3,849,721 A | * | 11/1974 | Calvert | 324/338 |
| 3,944,910 A | * | 3/1976 | Rau | 324/338 |
| 4,511,842 A | | 4/1985 | Moran et al. | |
| 5,345,179 A | * | 9/1994 | Habashy et al. | 324/338 |
| 5,434,507 A | * | 7/1995 | Beren et al. | 324/338 |
| 7,284,605 B2 | * | 10/2007 | Clark et al. | 166/254.2 |

FOREIGN PATENT DOCUMENTS

| | | |
|---|---|---|
| EP | 1662274 | 5/2006 |
| EP | 1693685 | 8/2006 |
| WO | 2006/037079 | 4/2006 |
| WO | 2006037079 | 4/2006 |

* cited by examiner

*Primary Examiner* — Jay Patidar
(74) *Attorney, Agent, or Firm* — Stephanie Chi; Matthias Abrell; Darla Fonseca

(57) ABSTRACT

An apparatus for investigating a geological formation surrounding a borehole including a logging tool moveable through the borehole, an electromagnetic probe 1 including a pad 2 mounted on the logging tool for engagement with the borehole by a wall-engaging face of the pad, at least one transmitting antenna TxA, TxB mounted in the wall-engaging face, and a plurality of spaced receiving antennas RxA, RxB mounted in the wall-engaging face spaced in relation to the transmitting antenna TxA, TxB. At least one of the antennas RxA, RxB, TxA, TxB is an open-ended antenna forming a substantially pure electric dipole normal to the pad face and wherein the first transmitting antenna of the at least one pair of transmitting antennas is positioned above the plurality of spaced receiving antennas and the second transmitting antenna of the at least one pair of transmitting antennas is positioned below the plurality of spaced receiving antennas.

16 Claims, 11 Drawing Sheets

ELECTROMAGNETIC LOGGING APPARATUS AND METHOD

FIELD OF THE INVENTION

The invention relates to an electromagnetic logging apparatus and method for measuring the electromagnetic properties of a subsurface formation in a limited zone surrounding a borehole. A particular application of the electromagnetic logging apparatus and method according to the invention relates to the oilfield services industry.

BACKGROUND OF THE INVENTION

Logging devices that measure geological formations electromagnetic properties (e.g. dielectric constant and conductivity) are known, for example from U.S. Pat. No. 5,434,507. The logging device includes a transmitter and spaced receivers mounted in a pad that is urged against a borehole wall, the borehole being drilled into geological formations. Microwave electromagnetic energy is transmitted into the formations, and energy that has propagated through the formations is received at the receivers. The phase and amplitude of the wave propagating in the formations is determined from the receivers output signals. The dielectric constant and the conductivity of the formations can then be obtained from the phase and amplitude measurements.

The transmitters and receivers comprise antennas that are assimilated to magnetic dipoles. These dipoles are tangential to the pad face and are orientated in different directions. A broadside mode corresponds to the dipoles oriented orthogonally to the pad axis. An endfire mode corresponds to the dipoles oriented in alignment with the pad axis. The depth of investigation for the broadside mode is poor. The investigation depth for the endfire mode is greater than for the broadside mode, but the signal is weaker. The attenuation and phase-shift are measured between the two receivers. A simple inversion allows in case of a homogeneous formation to retrieve the dielectric constant and the conductivity. When the antennas are disposed in a two dimensional array, it is possible to obtain a permittivity $\epsilon$ image and a conductivity $\sigma$ image of the formation surrounding the borehole.

Typically, such a logging device is unable to provide an accurate measurement of the formation properties because of its high sensitivity to the standoff of the pad relatively to the formation or the presence of a mudcake layer on the borehole wall. Even a thin film of nonconductive mud or mud filtrate constitutes an opaque layer, preventing conventional micro-resistivity imagers from measuring the formation. Oil-base mud (non-conductive mud) can be replaced with water-base mud (conductive mud), though, at considerable expense. Further, there is no guarantee that measurement will be possible. Thus, there is a need of addressing the problem of obtaining micro-resistivity images of the formation in the hereinbefore mentioned difficult environment.

SUMMARY OF THE INVENTION

It is an object of the invention to propose an electromagnetic logging apparatus and method that overcomes at least one of the drawbacks of the prior art devices and methods.

According to an aspect, the invention relates to an apparatus for investigating a geological formation surrounding a borehole, comprising:
- a logging tool moveable through the borehole,
- an electromagnetic probe comprising a pad mounted on the logging tool, adapted for engagement with the borehole by a wall-engaging face of the pad,
- at least one transmitting antenna mounted in the wall-engaging face,
- a plurality of spaced receiving antennas mounted in the wall-engaging face spaced in relation to the transmitting antenna, and
- wherein at least one of the antennas is an open-ended antenna forming a substantially pure electric dipole normal to the pad face.

Advantageously, the open-ended antenna is a coaxial open-ended antenna substantially perpendicular to the wall-engaging face of the pad.

Advantageously, the open-ended coaxial antenna comprises an inner and outer conductors separated by a dielectric material, the antenna being embedded in the pad.

The outer conductor may be formed by the wall-engaging face of the pad, said wall-engaging face being made of a conductive material.

The apparatus may comprise a plurality of antennas used as a first set of transmitting antennas and a plurality of antennas used as a first set of receiving antennas, the first set of transmitting antennas being disposed along at least a first line, the first set of receiving antennas being disposed along at least a second line substantially parallel to the first line.

The apparatus may comprise two lines of receiving antennas and two lines of transmitting antennas, the two lines of receiving antennas being approximately disposed in the middle of the metallic pad, the two lines of transmitting antennas being positioned symmetrically above and below the receivers lines at determined distances, all the lines being substantially parallel to each other.

The apparatus may further comprise a first set of reflection transmitting antenna positioned between the first transmitter line and the first receiver line and a second set of reflection transmitting antenna positioned between the second transmitter line and the second receiver line, each set comprising at least one transmitting antenna.

The aperture of the transmitting antennas may be larger than the aperture of the receiving antennas. At least a first and a second open-ended coaxial antenna may have different diameters.

The first line of receiving antennas may be laterally shifted relatively to the second line of receiving antennas so as to define a "zig-zag" configuration of receiving antennas.

The apparatus may further comprises:
- a transmitter module adapted for energizing the transmitting antenna to transmit electromagnetic wave into the formations at a determined frequency, the transmitter module comprising a low frequency oscillator coupled to a IQ modulator,
- a receiver module adapted for receiving and processing an output signal at each of the receiving antennas representative of electromagnetic wave received from the formations, the receiver module comprising a mixer, and
- a master oscillator delivering a high frequency signal to the IQ modulator of the transmitter module and to the mixer of the receiver module.

The master oscillator may deliver a determined frequency ranging between 10 MHz and 10 GHz.

According to a further aspect, the invention relates to an electromagnetic method of logging geological formations surrounding a borehole using an apparatus according to the invention, comprising the steps of:

a) running the apparatus through the borehole and engaging a pad with a borehole wall so as to define a selected zone made of a medium to be investigated, b) performing a first set of measurements at a deep radial depth of investigation in the selected zone by:

b1) operating transmitting and receiving antennas so that each antenna defines a substantially pure electric dipole normal to the pad face, and radiating electromagnetic signals in the medium, b2) measuring a first set of attenuation and phase shift of the electromagnetic signals having traveled in the medium between the transmitting and receiving antennas, c) performing a second set of measurements at a shallow radial depth of investigation in the selected zone by:

c1) operating transmitting and receiving antennas so as each antenna defines a substantially pure electric dipole normal to the pad face, and radiating electromagnetic signals in the medium, c2) measuring a second set of magnitude and phase of the electromagnetic signals reflected by the formation at the reflection antennas, and d) performing an inversion calculation based on the first and second set of measurements and determining the permittivity $\epsilon$ and the conductivity $\sigma$ of the geological formation in the selected zone.

The method may further comprise the steps of performing reflection measurements at a deep depth of investigation and a shallow radial depth of investigation in the selected zone.

Alternatively, when the medium comprises a geological formation covered by a mudcake layer, the step d) comprises performing an inversion calculation based on the first and second set of measurements and determining the permittivity $\epsilon$, the conductivity $\sigma$ and thickness h of the mudcake layer, and the permittivity $\epsilon$ and the conductivity $\sigma$ of the geological formation in the selected zone.

The method may further comprise forming an image of the selected zone of the geological formation based on the inversion calculation.

The invention enables providing an accurate electrical borehole image generated from the micro-resistivity measurements even in difficult environment. The micro-resistivity imaging can be obtained in oil-base mud (nonconductive) or water-base mud (conductive) environment.

The substantially pure electric dipole compared to magnetic dipoles enables a simple mechanical realization by an open-ended coaxial wire and an antenna of smaller size. It also enables the possibility of measuring the reflected wave and providing very shallow reflection measurement.

The invention enables performing quantitative measurements of the conductivity (inverse of the resistivity) and the dielectric constant. The dielectric constant may be interpreted to provide other useful petrophysical information related to the geological formation. The invention renders visible fine details, e.g. at the most 50 µm wide fractures filled with fluids. These images help in understanding the reservoir structure, identifying and evaluating sedimentary features and fractures, and visualizing rock texture. For example, the structural geology (structural dips determination, detection and determination of faults, sedimentary features determination, sedimentary dips determination), or thin-bed (paleocurrent directions, definition and characterization of sedimentary bodies and their boundaries, recognition of anisotropy, permeability barriers, and permeability paths, recognition and evaluation of thinly bedded reservoirs), or rock texture (qualitative vertical grain-size profile, determination of carbonate texture, detection and evaluation of secondary porosity, detection and evaluation of fracture systems) can be detected and identified with the micro-resistivity images provided by the apparatus and method of the invention even in environment where a mudcake layer is present on the borehole wall.

These and other aspects of the invention will be apparent from and elucidated with reference to the embodiments described hereinafter.

BRIEF DESCRIPTION OF THE DRAWINGS

The present invention is illustrated by way of example and not limited to the accompanying figures, in which like references indicate similar elements.

DETAILED DESCRIPTION OF THE INVENTION

Figure 1:
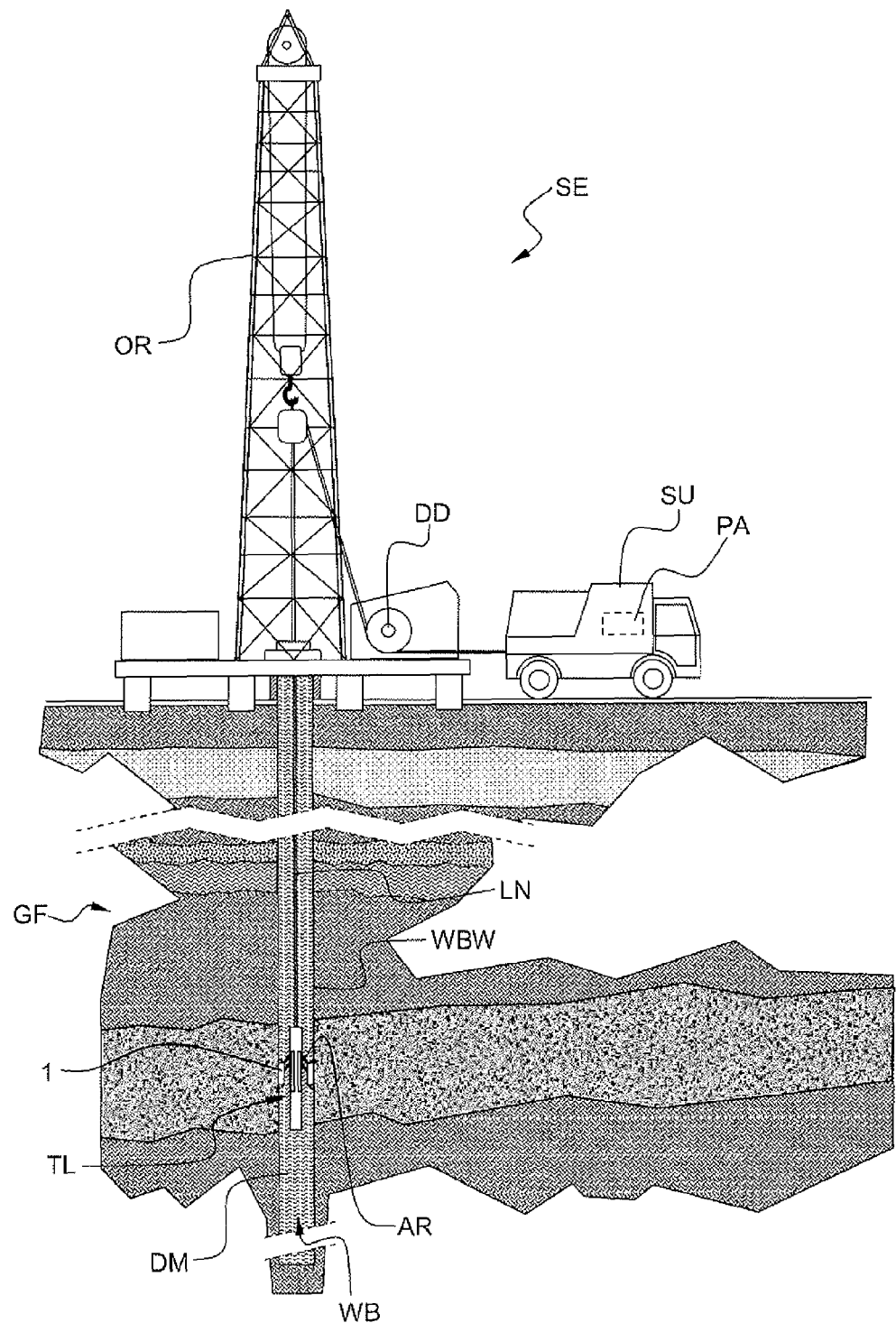
FIG. 1 schematically illustrates a typical onshore hydrocarbon well location where an apparatus of the invention is being operated.

FIG. 1 schematically shows a typical onshore hydrocarbon well location and surface equipments SE above a hydrocarbon geological formation GF after drilling operations have been carried out. At this stage, i.e. before a casing string is run and before cementing operations are carried out, the wellbore is a borehole WB filled with a fluid mixture DM. The fluid mixture DM is typically a mixture of drilling fluid and drilling mud. In this example, the surface equipments SE comprises an oil rig OR and a surface unit SU for deploying a logging apparatus TL in the well-bore. The surface unit may be a vehicle coupled to the logging apparatus by a line LN. Further, the surface unit comprises an appropriate device DD for determining the depth position of the logging apparatus relatively to the surface level. The logging apparatus TL comprises various sensors and provides various measurement data related to the hydrocarbon geological formation GF and/or the fluid mixture DM. These measurement data are collected by the logging apparatus TL and transmitted to the surface unit SU. The surface unit SU comprises appropriate electronic and software arrangements PA for processing, analyzing and storing the measurement data provided by the logging apparatus TL.

The logging apparatus TL comprises an electromagnetic probe 1 for measuring the electromagnetic properties of a subsurface formation according to the invention. Once the logging apparatus is positioned at a desired depth, the electromagnetic probe 1 can be deployed from the logging apparatus TL against the borehole wall WBW by an appropriate deploying arrangement AR.

FIGS. 2 to 7 schematically show a borehole wall contacting side view of an electromagnetic probe 1 for measuring the electromagnetic properties of a subsurface formation according to various embodiments. The electromagnetic probe 1 comprises a pad 2 in which are embedded transmitters $T_x$ and receivers $R_x$. Advantageously, the pad may also comprise an electronic arrangement 4 (shown in details in FIG. 8) that operates the transmitters and receivers. The pad is a conductive metal housing, for example made in a metallic material like stainless steel arranged to be positioned in contact with a well-bore wall WBW. The pad 2 is coupled to the logging apparatus TL by for example an arm (shown in FIGS. 1 and 4). The arm enables the deployment of the pad 2 into the borehole WBH against the well-bore wall WBW. One or more coaxial cables (not shown) may be run though the arm for connecting the electronic arrangement to the logging apparatus TL. The logging apparatus TL contains the bulk of the down-hole electronics (not shown) and provides energy and control commands, and gathers measurements from the electromagnetic probe 1. Alternatively, the electronic arrangement may comprise a data communication module (not shown) for directly transmitting measurements to the surface equipment SE and receiving control commands from it.

Figure 2:
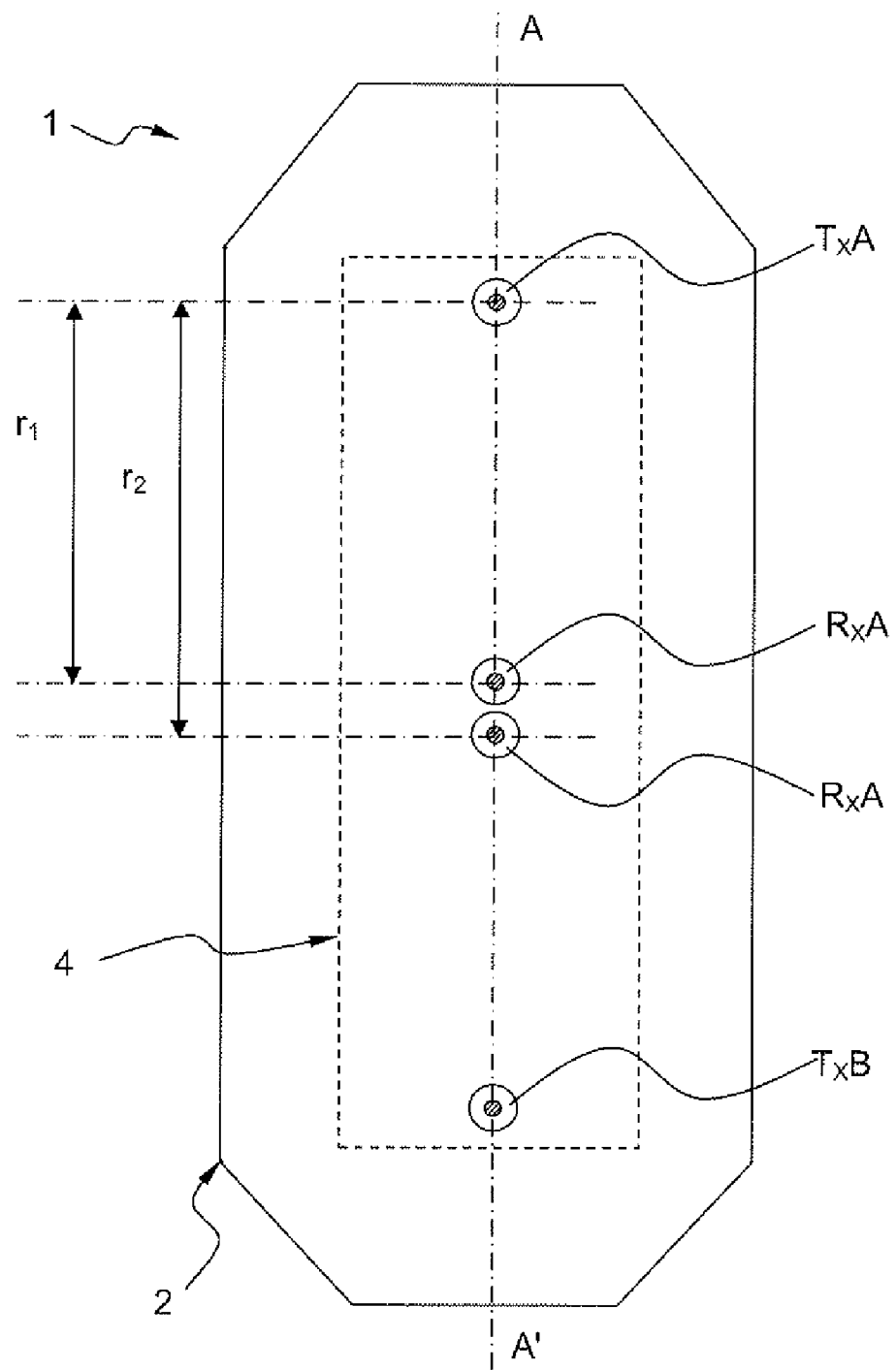
FIGS. 2, 3, 5, 6, 7 schematically show a borehole wall contacting side view of a pad for measuring the electromagnetic properties of a subsurface formation according to a first, second, third, fourth and fifth embodiment, respectively.

FIG. 2 schematically shows a pad for measuring the electromagnetic properties of a subsurface formation according to a first embodiment. The first embodiment corresponds to a configuration comprising two transmitters $T_xA$ and $T_xB$ and two receivers $R_xA$ and $R_xB$. The two receivers are approximately disposed in the middle of the metallic pad along AA' axis. The two transmitters $T_xA$, $T_xB$ are positioned symmetrically above and below the receivers $R_xA$, $R_xB$ at determined distances $r_1$ and $r_2$. The receivers and transmitters comprise antennas. Each antenna is an open-ended coaxial antenna (shown in details in FIGS. 9 and 10). Electrically, such an antenna can be assimilated to a pure electric dipole, normal to the pad surface. The induced voltage $V_{ind}$ on a receiver due to the excitation of a transmitter is given by:

$$V_{ind} = \int_{dipolelength} \vec{E} \cdot \vec{dl},$$

where E is the electric field at the receiver location. As, the transmitter is an electric dipole, and with a homogeneous medium hypothesis, the electric field at the receiver location (at a distance r from the transmitter) is given by:

$$E(r) = \frac{p}{\varepsilon} \frac{e^{jkr}}{4\pi r^3}[1 - jkr + k^2 r^2],$$

where p is the electric dipole moment of the transmitter, $\epsilon$ is the permittivity of the medium, and k is the wave number. The wave number k may be expressed as function of the medium (geological formation alone or covered with a mudcake layer) dielectric properties, namely:

$$k = \frac{\omega}{c}\sqrt{\mu_r}\sqrt{\varepsilon_r + j\sigma/\omega\varepsilon_0},$$

where $\epsilon_0$ go is the dielectric permittivity in vacuum, $\sigma$ is the conductivity of the medium, $\epsilon_r$ is the relative dielectric permittivity and $\mu_r$ is the relative magnetic permeability of the medium (assumed to be 1).

The induced voltage is then given by:

$$V_{ind} = \frac{pl}{\varepsilon} \frac{e^{jkr}}{4\pi r}[1 - jkr + k^2 r^2],$$

where l is the electric-dipole effective length of the receiver. The averaged attenuation AT and phase-shift PS, measured between the two receivers $R_xA$ and $R_xB$, are not dependant on the electronic arrangement or antennas gains due to the application of the borehole compensation scheme. Finally the attenuation AT and phase-shift PS are related with the following equation:

$$AT - jPS = \ln\sqrt{\frac{V_{R_xA}(T_xA) \times V_{R_xB}(T_xB)}{V_{R_xA}(T_xB) \times V_{R_xB}(T_xA)}}$$
$$= 3\ln\left(\frac{r_2}{r_1}\right) + jk(r_1 - r_2) - \ln\left(\frac{1 - jkr_2 - k^2 r_2^2}{1 - jkr_1 - k^2 r_1^2}\right)$$

Hence, by measuring the attenuation AT and phase-shift PS between the two receivers $R_xA$ and $R_xB$, the wave number k can be easily retrieved. Subsequently, the permittivity $\epsilon$ of the medium and the conductivity $\sigma$ of the medium can be calculated with an iterative procedure, as $r_1$ and $r_2$ are known.

Figure 3:
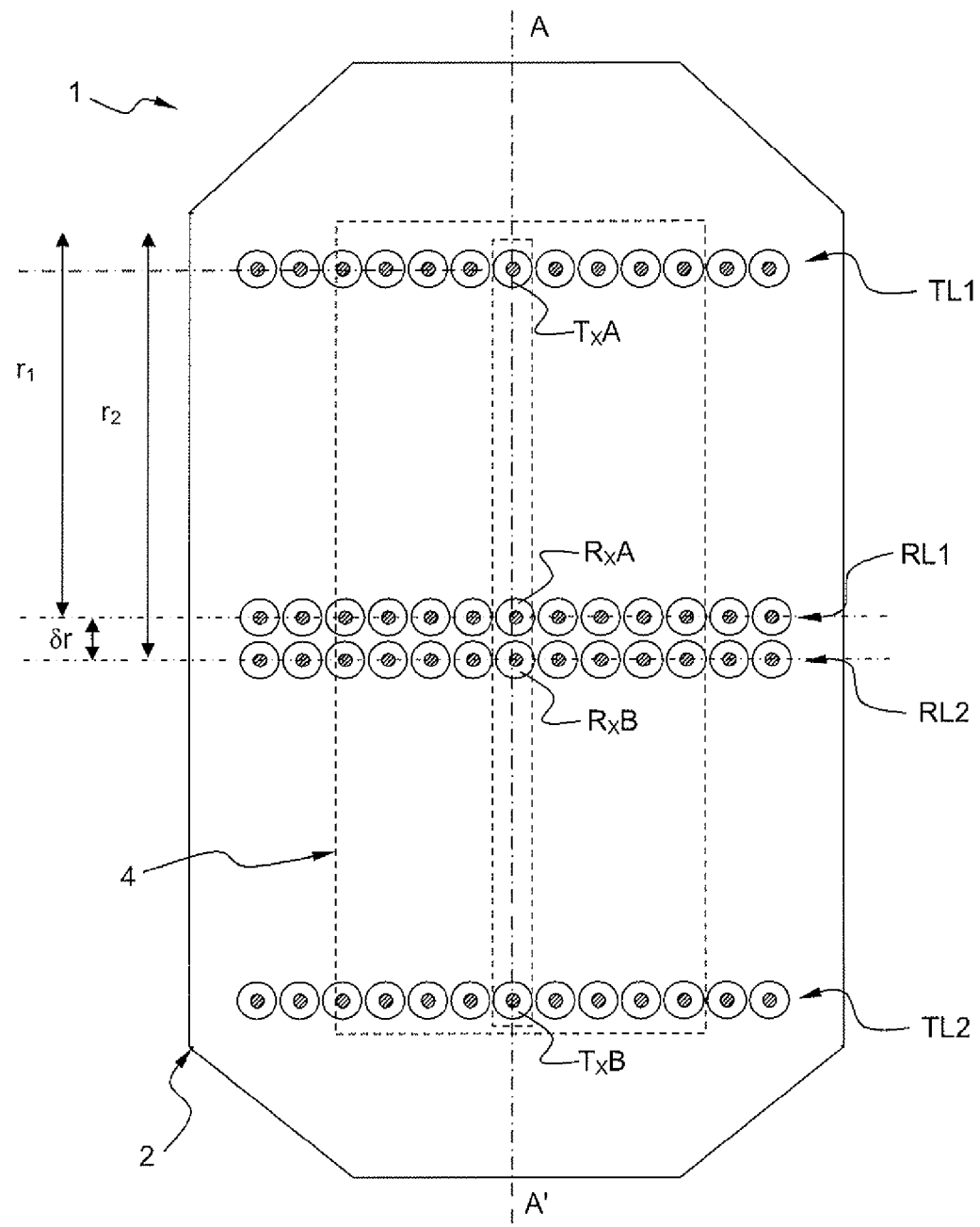

FIG. 3 schematically shows a pad for measuring the electromagnetic properties of a subsurface formation according to a second embodiment. The second embodiment enables obtaining micro-resistivity images by multiplying the number of four dipoles set as described in relation with FIG. 2. The second embodiment corresponds to a configuration comprising a 2D-array comprising two lines RL1, RL2 of receivers $R_xA$ and $R_xB$ and two lines TL1, TL2 of transmitters $T_xA$ and $T_xB$. The two lines of receivers are approximately disposed in the middle of the metallic pad. The two lines of transmitters are positioned symmetrically above and below the receivers lines at determined distances $r_1$ and $r_2$. Advantageously, all these lines are substantially parallel to each other. Each receiver and transmitter comprises antennas. Each antenna is an open-ended coaxial antenna. For example, the distance $\delta r$ between the receivers may be approximately 5 mm, which corresponds to the image resolution. The distance between the transmitters and the receivers may be around 4 or 5 cm.

Figure 4:
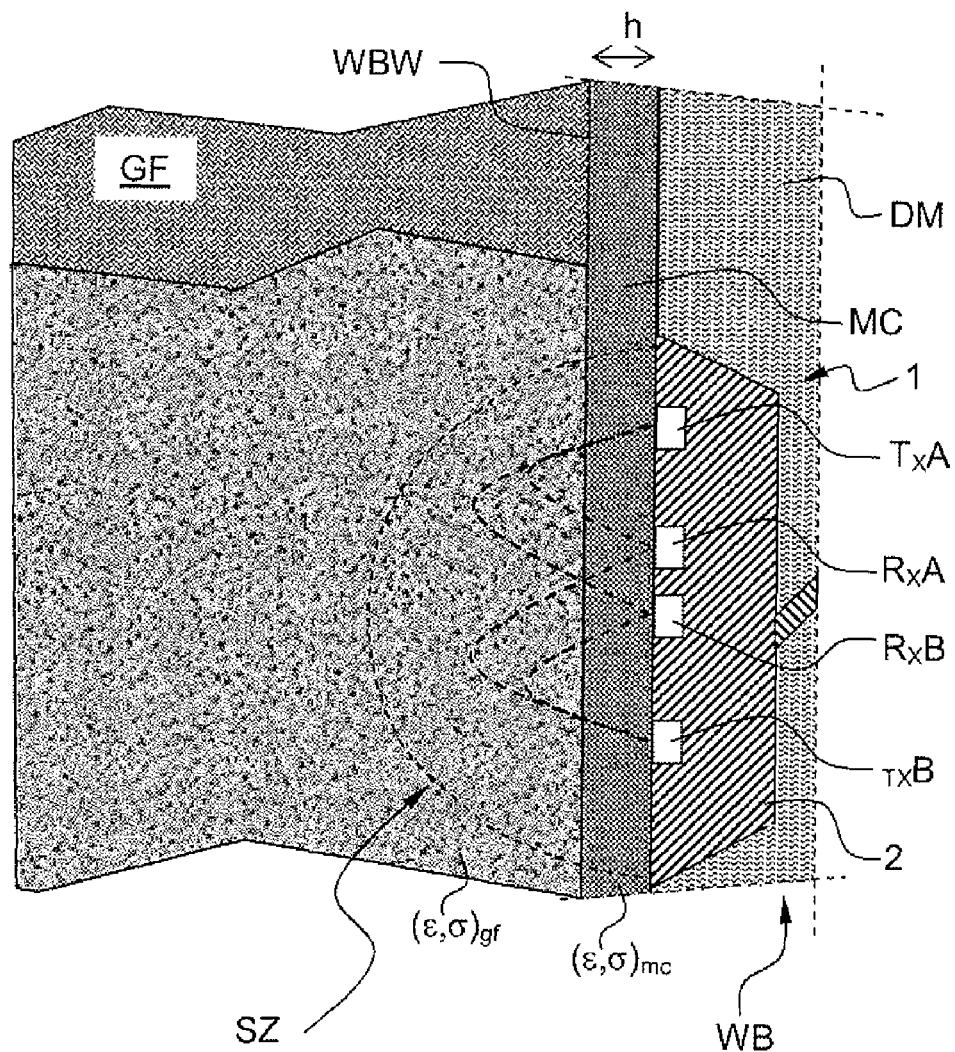
FIG. 4 is a cross section-view schematically showing a pad of the invention positioned into a borehole and contacting a mudcake formed onto the borehole wall.

FIG. 4 is a cross section-view schematically showing a pad of the invention positioned into a borehole and contacting a mud cake layer MC formed onto the borehole wall WBW.

A limitation of the measurements with the first and second embodiments is the high sensitivity to standoff due for example to the presence of a mud cake layer MC on the borehole wall. In this situation, the number of unknowns increase from two unknowns, namely the permittivity $\epsilon$ and the conductivity ca of the formation $(\epsilon, \sigma)_{gf}$ to five unknowns, namely the permittivity $\epsilon$ and the conductivity $\sigma$ of the mud cake layer $(\epsilon,\sigma)_{mc}$, the mud cake thickness h in addition to the two unknowns $(\epsilon,\sigma)_{gf}$. With only two measurements, namely the attenuation AT and the phase-shift PS, the determination of the electromagnetic properties of a selected zone SZ of the geological formation can not be accurately extracted.

Figure 5:
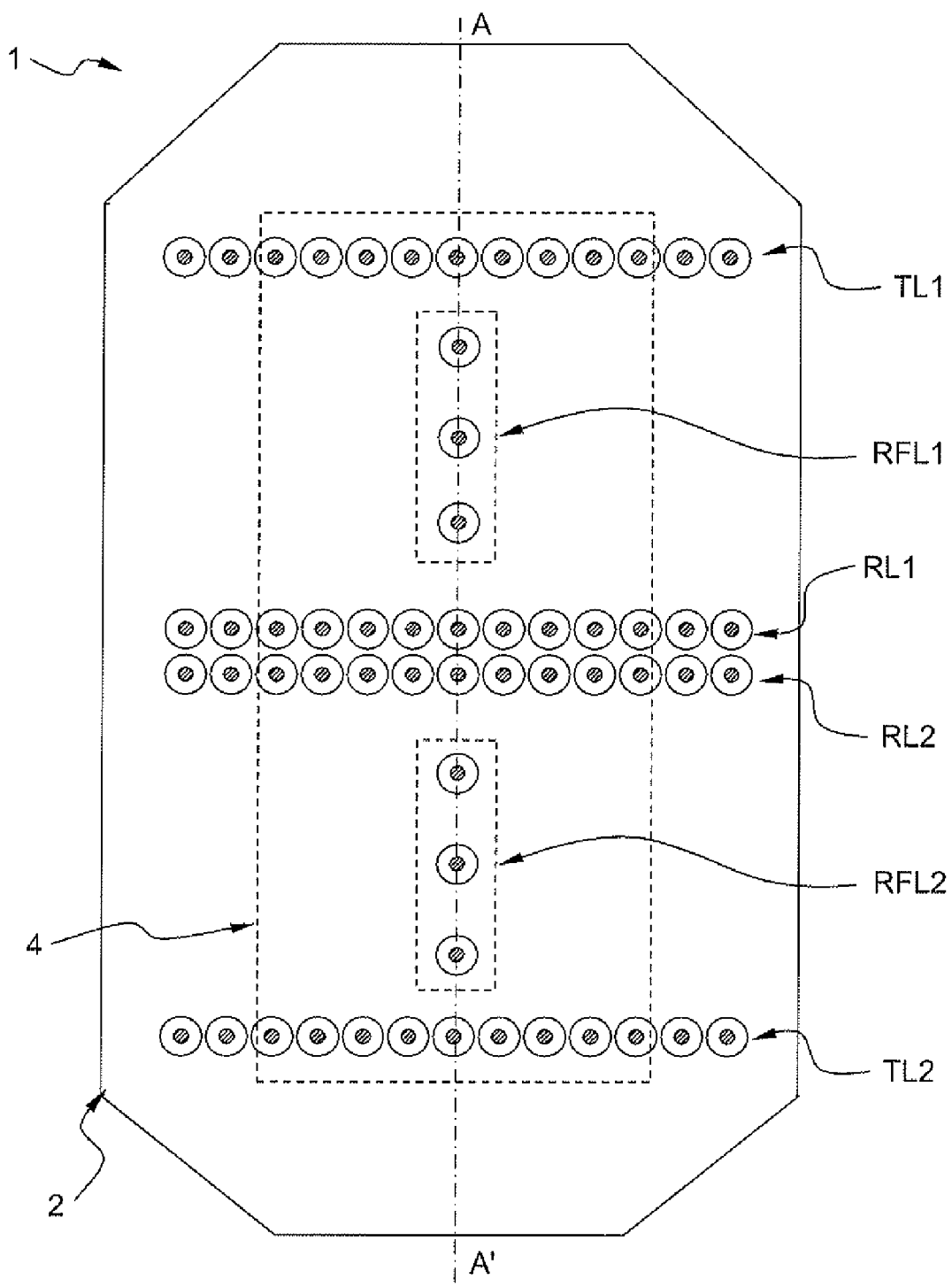

FIG. 5 schematically shows a pad for measuring the electromagnetic properties of a subsurface formation according to a third embodiment. The third embodiment enables obtaining micro-resistivity images even with the presence of a mud cake layer by adding further transmitters to the second embodiment described in relation with FIG. 3. The third embodiment corresponds to the configuration of the second embodiment with a line of reflection transmitter RFL positioned perpendicularly to and between the two lines of transmitters TL1, TL2 that are positioned symmetrically above and below the receiver lines RL1, RL2, respectively. For example, a first set RFL1 of three additional transmitters are positioned between the first transmitter line TL1 and the first receiver line RL1 and a second set RFL2 of three additional transmitters are positioned between the second transmitter line TL2 and the second receiver line RL2. Each additional transmitter comprises an antenna. Each antenna is an open-ended coaxial antenna. The impedance of the open-ended coaxial antenna is very sensitive to the external medium in contact with the antenna. The additional transmitters are used to perform reflection measurements. The depth of investigation of the reflection measurements is very shallow, i.e. approximately the radius of the antenna. Hence, a reflection measurement will be only sensitive to the mud cake layer. Further, the additional transmitters RFL1, RFL2 show different spacings relatively to the receivers. Each spacing corresponds to a different depth of investigation. These reflection measurements at different depth of investigation combined with the attenuation AT and the phase-shift PS measurements enables resolving the five unknowns in the equation as hereinbefore mentioned and correcting for the mud cake layer standoff. The dielectric properties of the mud cake layer and of the geological formation can be retrieved.

The reflection transmitter may be open-ended coaxial antenna. By using two open-ended coaxial antennas with different diameter, it is possible to obtain additional information of the very shallow zone in front of the pad (i.e. the standoff and mudcake), through the determination of the permittivity $\varepsilon_{med}$, $\varepsilon_{lrg}$ for a medium diameter antenna and a large diameter antenna, respectively:

$$\begin{cases} \varepsilon_{med} = (\varepsilon_f - \varepsilon_{mc})\exp(-d/D_{med}) + \varepsilon_{mc} \\ \varepsilon_{lrg} = (\varepsilon_f - \varepsilon_{mc})\exp(-d/D_{lrg}) + \varepsilon_{mc}, \end{cases}$$

where $D_{med}$ and $D_{lrg}$ are geometrical parameters directly associated to the probe diameters.

The receiver may also be used as a reflection probe having a small diameter in comparison with the two open-ended coaxial antennas so as to provide a third set of data ($\varepsilon_{sma}$, $D_{sma}$).

Figure 6:
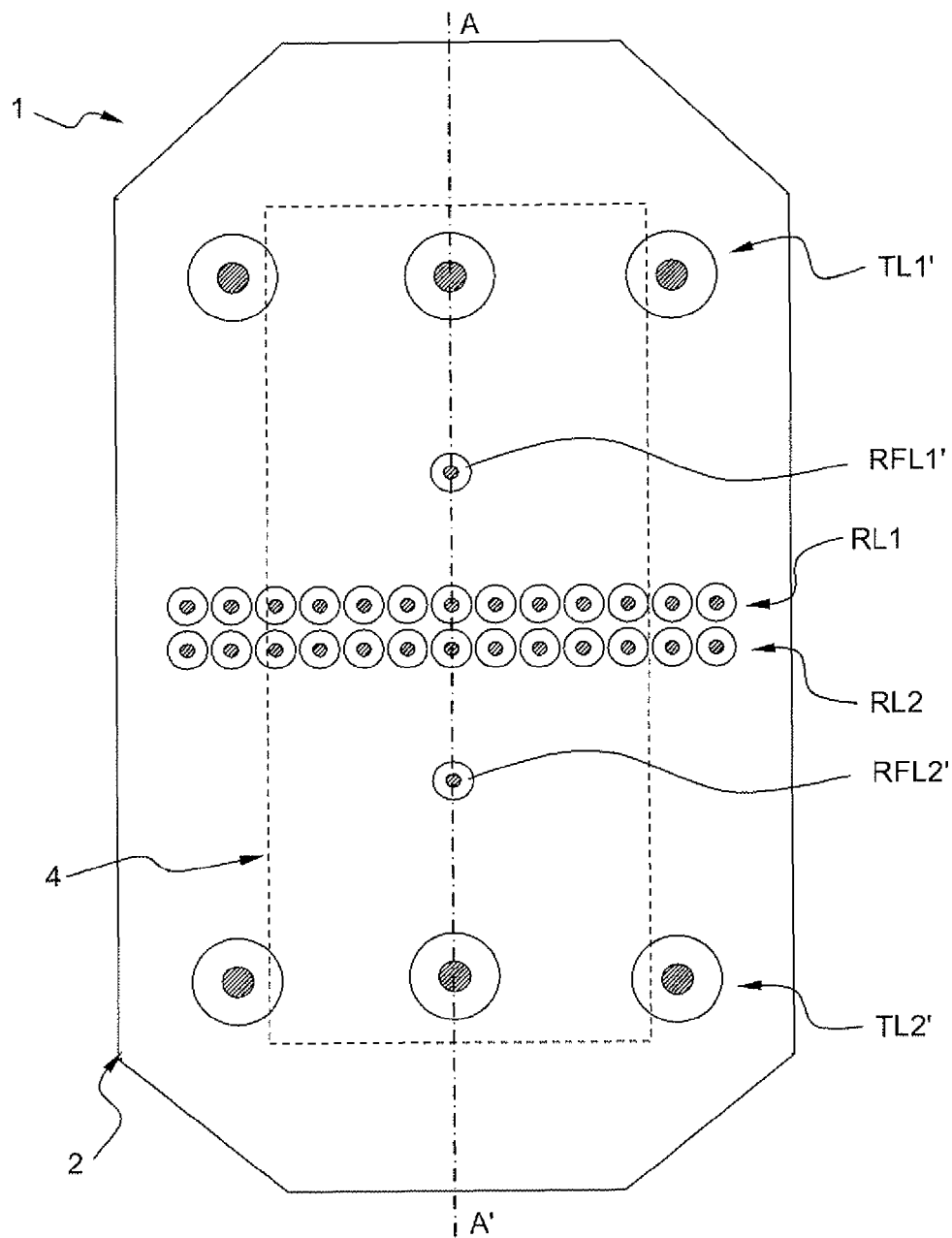

FIG. 6 schematically shows a pad for measuring the electromagnetic properties of a subsurface formation according to a fourth embodiment. In order to simplify the configuration according to the third embodiment, the fourth embodiment proposes to decrease the number of transmitters. For example, it is possible to construct a high-quality image, corrected from the mud cake layer effects by having only three transmitters TL1', TL2' above and below the receivers. However, due to efficiency concerns, the aperture of the transmitters of the fourth embodiment is larger than the aperture of the transmitters of the third embodiment. Further, only one additional reflection transmitter RFL1', RFL2' may be used for the reflection measurements, one between the first transmitter TL1' and the first receiver line RL1, and one between the second transmitter TL2' and the second receiver line RL2. Both reflection transmitters are positioned approximately in the middle of the distance separating the transmitter and the receiver lines.

Figure 7:
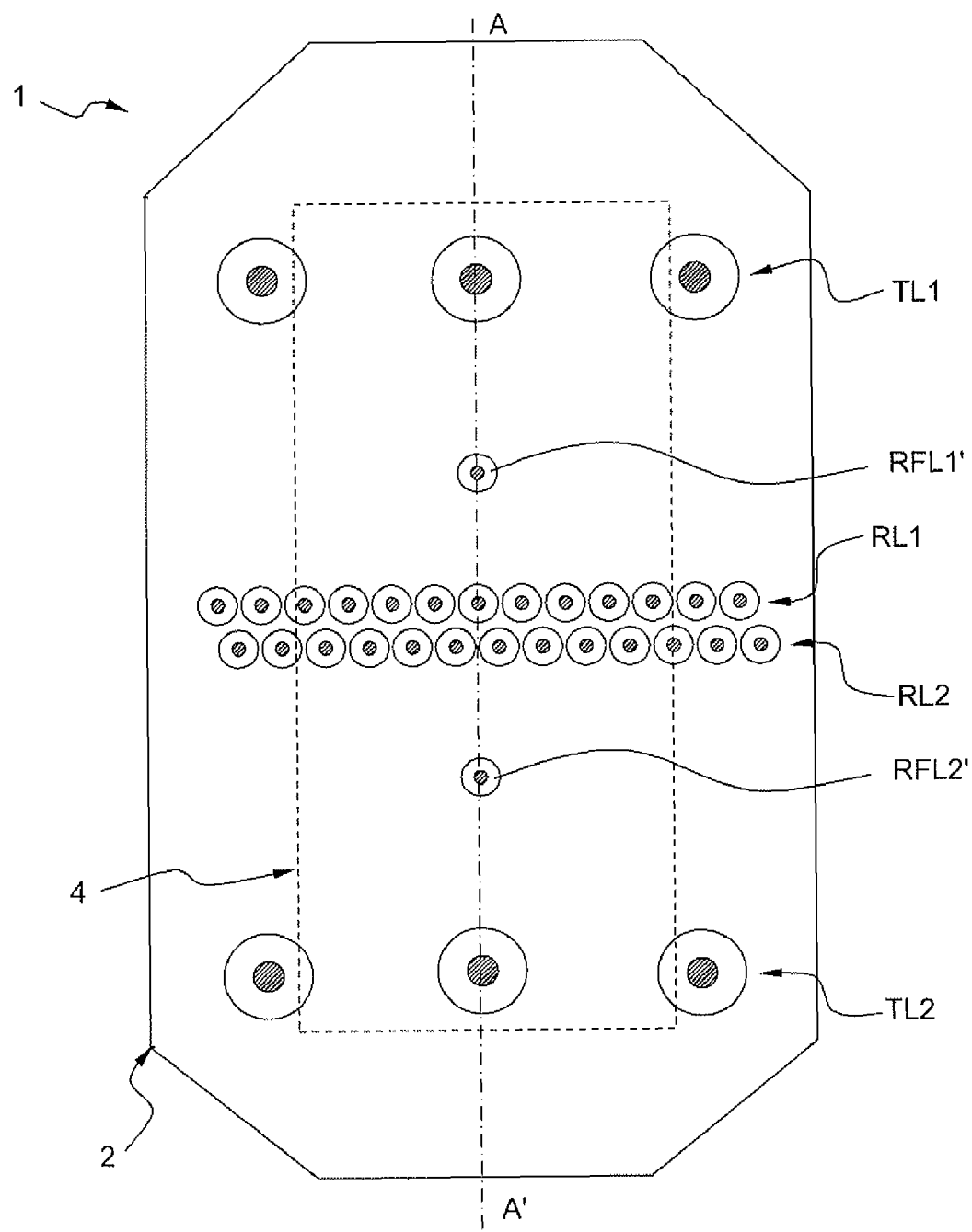

FIG. 7 schematically shows a pad for measuring the electromagnetic properties of a subsurface formation according to a fifth embodiment. In order to improve the resolution of the micro-resistivity images, the fifth embodiment proposes a "zig-zag" configuration of the first line RL1 of receiver relatively to the second line RL2 of receiver. The first and second lines of receiver are shifted relatively to each other.

Figure 8:
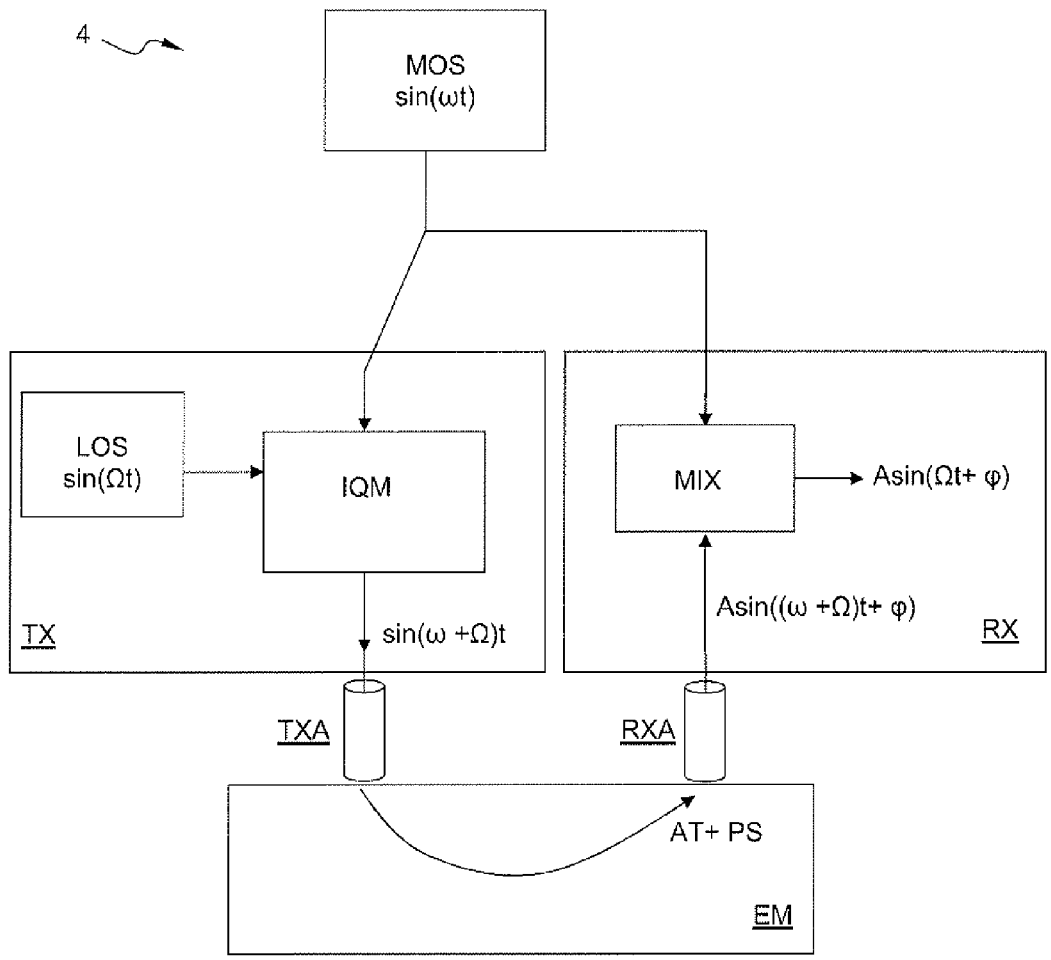
FIG. 8 functionally illustrates an example of high frequency electronic arrangement.

FIG. 8 diagrammatically illustrates an example of high frequency electronic arrangement 4. The high frequency electronic arrangement comprises a plurality of transmitter module TX and a plurality of receiver module RX coupled, on the one side, to a master oscillator MOS, and to the other side, to the respective transmitting antennas TXA and the respective receiving antennas RXA, respectively. For sake of clarity, FIG. 8 only depicts one transmitter TX associated to one transmitting antenna TXA, and one receiver RX associated to one receiving antenna RXA. The high frequency electronic arrangement must be able to perform an important quantity of measurements.

The architecture of each transmitter module TX is relatively complex, while each receiver module RX is quite simple. The master oscillator MOS delivers a high frequency signal sin($\omega$t), for example a frequency of 1 GHz. The transmitter module TX comprises a low frequency oscillator LOS and an IQ modulator IQM. The low frequency oscillator LOS delivers a low frequency signal sin($\Omega$t), for example a frequency of 10 kHz, to the IQ modulator IQM. The IQ modulator IQM also receives the high frequency signal from the master oscillator MOS. Advantageously, the IQ modulator IQM enables side band suppression. It delivers a high frequency signal sin($\omega+\Omega$)t to one transmitting antenna TXA. The transmitted signals propagate into the external medium EM where they modulate in amplitude with the formation conductivities to produce low-frequency signals rich in petrophysical and lithological information and a high-resolution component that provides the micro-scale information used for imaging and dip interpretation. The receiving antenna RX receives a signal A sin(($\omega+\Omega$)t+$\phi$) that has been attenuated A and phase shifted $\phi$. The receiver module is only a mixer MIX coupled to the master oscillator MOS that converts the high frequency signal in a low frequency signal A sin($\Omega$t+$\phi$). For example, the mixer may be based on a semiconductor chip as used in the cell-phone industry that typically comprises low noise amplifiers.

In order to avoid a multiplexing of the transmitter modules, each transmitter module may have its own low frequency signature. In that case, the low frequency signal demodulated on each receiver module will carry the information from all the receiver modules.

Figure 9:
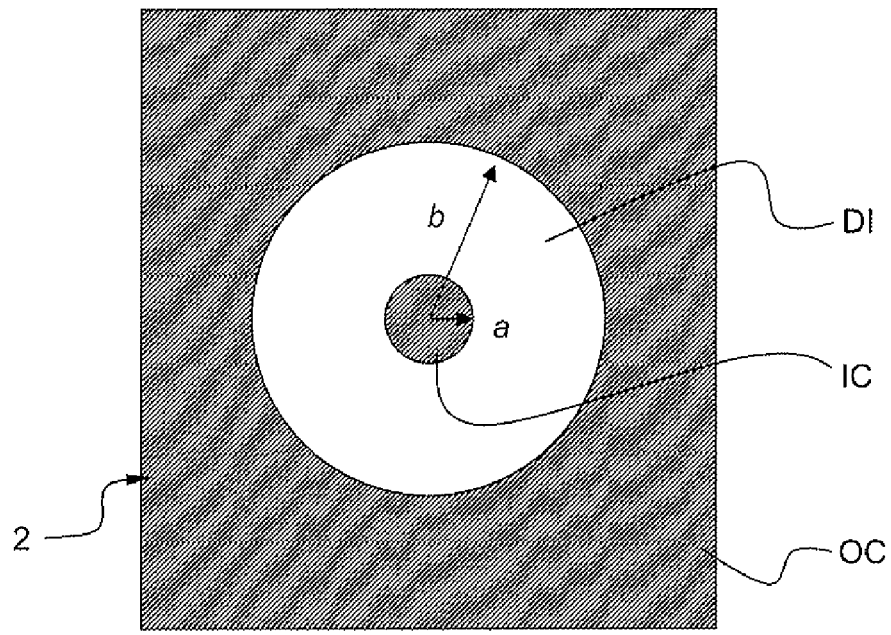
FIGS. 9 and 10 are a front and profile cross-section views schematically showing the open-ended coaxial antenna, respectively.
Figure 10:
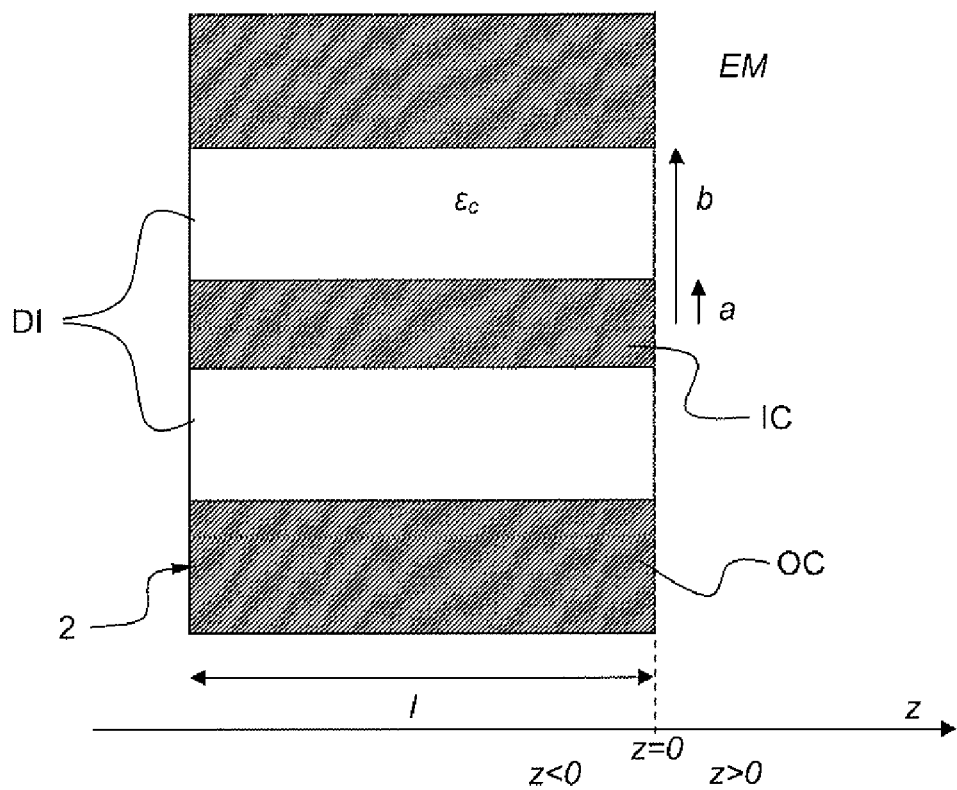

The theory related to the transmission and reflection measurements made with the open-ended coaxial antenna of the invention will now be described in details. FIGS. 9 and 10 are a partial front and profile cross-section views in a pad schematically showing the open-ended coaxial antenna of the invention, respectively.

The open-ended coaxial antenna shown in FIGS. 9 and 10 is an ideal structure. The antenna is a circular coaxial transmission line comprising an inner and outer conductor having inner IC and outer OC conductor radii a and b, respectively. The inner and outer conductors are separated by a dielectric material Di having a dielectric constant $\varepsilon_c$. The antenna is inserted in a perfectly conducting plane, i.e. the metallic pad. The antenna is backed by a homogeneous medium. The medium is characterized with its dielectric properties $\epsilon^*$, with: $\epsilon^*=\epsilon_r+j\sigma/\omega\epsilon_0$, where $\epsilon_0$ is the dielectric permittivity in vacuum and $\epsilon r$ is the relative dielectric permittivity of the medium.

To derive an analytical expression of the aperture admittance of the open-ended coaxial antenna, the idealized structure shown in FIG. 9 is considered. The aperture admittance is obtained by matching the electromagnetic fields at the aperture (corresponding to z-direction with z=0) between the coaxial line and the medium considered as infinite. It is assumed that the line is excited in its main transverse electromagnetic mode (TEM). The fields inside the line (corresponding to z-direction with z<0) are the superposition of forward traveling and reflected waves. Further, it is assumed that the contribution of the TM modes may be neglected. The magnetic field distribution (assuming radial symmetry) in the coaxial line is given by:

$$H^-(\rho, z) = \frac{A_0}{\rho}[e^{jk_c z} - \Gamma e^{-jk_c z}],$$

where:

$$k_c = \frac{\omega}{c}\sqrt{\varepsilon_c},$$

$$A_0 = \frac{\varepsilon_c \varepsilon_0}{k_c \omega (1+\Gamma) \ln\frac{b}{a}} \int_a^b E_\rho(\rho, 0) d\rho, \text{ and}$$

$\Gamma$ designates the reflection coefficient of the main transverse electromagnetic mode TEM.

The aperture admittance can be written as:

$$\frac{Y}{Y_C} = \frac{1-\Gamma}{1+\Gamma},$$

where $Y_C$ is the characteristic admittance of the line and is equal to:

$$2\pi\sqrt{\frac{\varepsilon_c \varepsilon_0}{\mu_0}}\frac{1}{\ln\frac{b}{a}}.$$

In the external medium region (corresponding to z-direction with z>0), the magnetic field is related to the tangential electric field in the aperture and is given by:

$$H^+(\rho, z) = \frac{jk^2}{2\pi\omega\mu_0}\int_a^b E_\rho(\rho', 0)\int_0^{2\pi} \cos(\phi)\frac{e^{jkr}}{r}\rho' d\rho' d\phi,$$

where:

$$r = \sqrt{\rho^2 = \rho'^2 - 2\rho\rho^\dagger \cos(\phi)}, \text{ and}$$

k is the wave number in the formation.

Finally, the aperture admittance can be written as:

$$Y = \frac{j2k^2}{\omega\mu_0 \left[\ln\left(\frac{b}{a}\right)\right]^2}\int_a^b\int_a^b\int_0^\pi \cos(\phi)\frac{e^{jkr}}{r}d\phi d\rho d\rho'.$$

This expression may be expressed in the different following way:

$$Y = \frac{j2k^2}{\pi\omega\mu_0\left[\ln\left(\frac{b}{a}\right)\right]^2}\int_0^\infty \frac{[J_0(\xi a)-J_0(\xi b)]^2}{\xi\sqrt{\xi^2-k^2}}d\xi,$$

where $J_0$ is the Bessel function of order 0.

When it is assumed that the wavelength is large compared to the open-ended coaxial antenna aperture, i.e kb<<1, the aperture admittance Y simplifies to:

$$Y = j\epsilon^* C_0 \omega,$$

where:

$$C_0 = \frac{2\pi\varepsilon_0}{\left[\ln\left(\frac{b}{a}\right)\right]^2}\int_0^\infty \frac{[J_0(\xi a)-J_0(\xi b)]^2}{\xi^2}d\xi$$

representing the capacitance which, in a
first approximation, does not depend on the external medium or frequency.

To derive an analytical expression of the reflection coefficient, we also consider the idealized structure of the open-ended coaxial antenna shown in FIG. 9.

The reflection coefficient is practically measured with for example a directional coupler having a given impedance. Typically, such impedance is equal to 50 Ohm.

The impedance at the measurement plane is given by:

$$Z = Z_C\frac{Z_a + jZ_c\tan(k_c l)}{Z_C + jZ_a\tan(k_c l)},$$

where:
l is the coaxial wire length,
$Z_0$ and Zc are the electronics impedance and the coaxial wire characteristics impedance, respectively, and $$Z_a = \frac{1}{j\varepsilon C_0 \omega}$$

is the impedance at the aperture plane.
The measured reflection coefficient is:

$$S = \frac{Z-Z_0}{Z+Z_0}.$$

Therefore, measuring the reflection coefficient S enables to determine the impedance at the measurement plane Z. As the length l and characteristic impedance Zc of the open-ended coaxial antenna is known, the impedance at the aperture plane $Z_a$, can be easily calculated. Finally, the permittivity $\epsilon$ and the conductivity $\sigma$ of the mud cake layer $(\epsilon, \sigma)_{mc}$ can be calculated.

In addition, an air calibration before logging may be performed in order to allow correcting for the open-ended coaxial antenna length.

As an open-ended coaxial antenna is a very poor radiator. Thus, it is necessary optimizing the choices of frequency, spacing and antenna size in order to have measurable signals in almost every logging condition. As a consequence, it is necessary to predict the signal level as function of frequency, formation properties, spacing, antenna geometry, etc. . . .

The transfer impedance, between a transmitter and a receiver antenna is defined as:

$$Z_{21} = \frac{V_R}{I_T},$$

where $V_R$ is the induced voltage on the receiver and $I_T$ is the current applied to the transmitter.

The transfer impedance $Z_{21}$ may be written as:

$$Z_{21} = -j\omega\mu \frac{e^{jkr}}{4\pi r^3}[1-jkr-k^2r^2]\frac{1}{k^2}\frac{l_T l_R}{2},$$

where:
k is the wave number,
r is the distance between the two antenna, and
$l_{T,R}$ is the electric dipoles effective length.
The transmission parameter is defined by:

$$S_{21} \approx 20\log_{10}\left|2\frac{Z_0 Z_{21}}{|Z+Z_0|^2}\right|,$$

where $Z_0$ is the generator impedance (for example 50 Ohm).

For example, with an transmitting module delivering 1 Watt (30 dBm) to the transmitter antenna, and a transmission parameter $S_{21}=-100$ dB, than the power delivered to the receiving module will be −70 dBm (30 dBm-100 dB). Due to noise consideration (the acquisition time depends on the logging speed), it is possible to measure signals as low as −100 dBm, with a signal-to-noise ratio of 40 dB (1%). It is assumed that the transmitting module can deliver 30 dBm. As a consequence, the maximum attenuation allowed for the transmission parameter is $S_{21}=-130$ dB.

Figure 11:
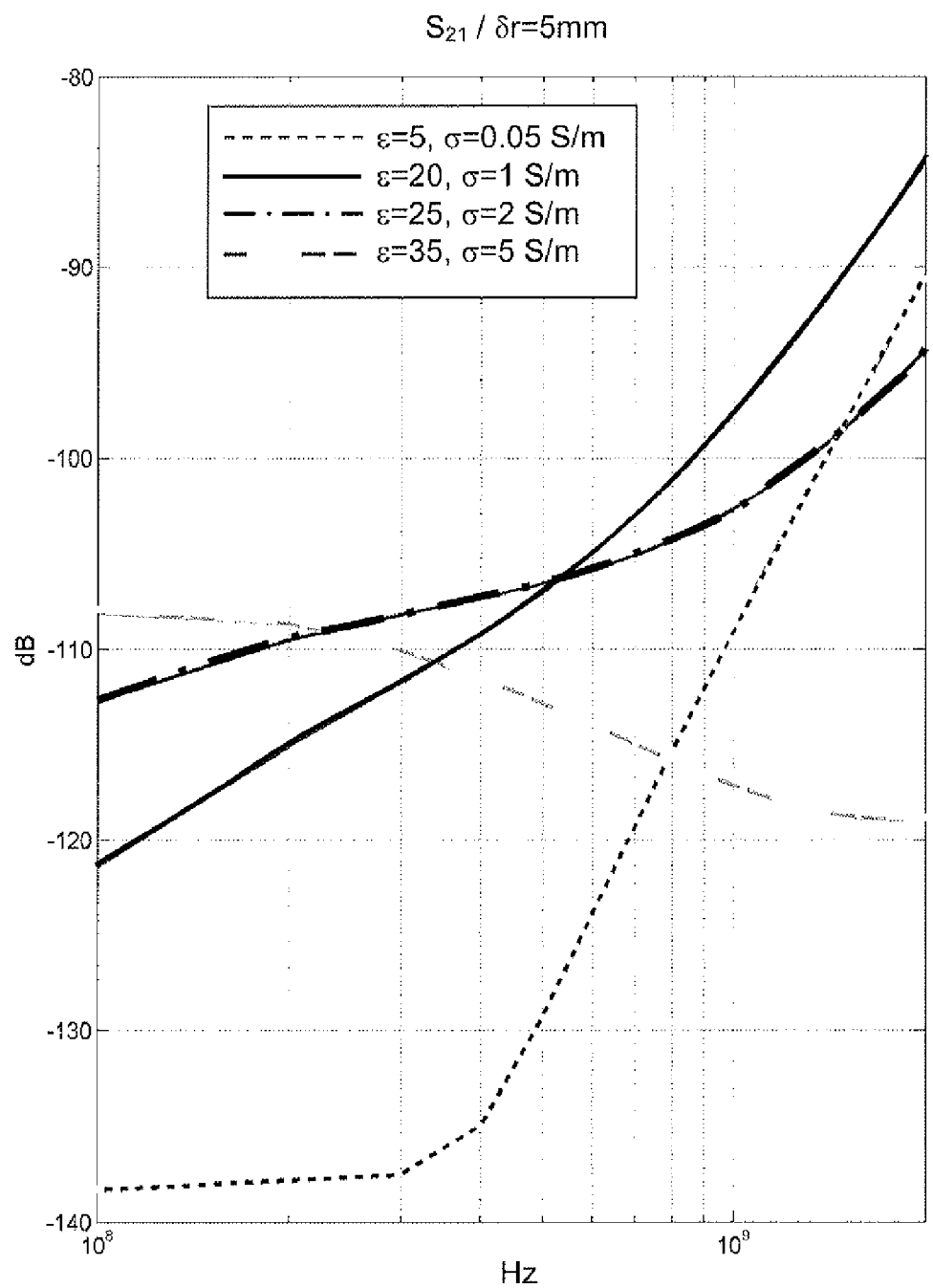
FIG. 11 shows curves illustrating the transmission efficiency parameter $S_{21}$ as a function of frequency and electromagnetic properties of the measured media.

FIG. 11 shows curves illustrating the transmission efficiency $S_{21}$ between two open-ended coaxial antennas, one being a transmitter antenna, the other being a receiving antenna. The curves represent the transmission efficiency versus frequency for different media (from very resistive media to very conductive media).

As an example, the receiver antenna dimensions are defined by the inner and outer conductor radii a=0.83 mm and b=2.05 mm, respectively. The transmitters antenna dimensions are defined by the inner and outer conductor radii a=1.27 mm and b=4.05 mm. The spacing $r_2$-$r_1$ is defined to 5 cm.

The transmission efficiency $S_{21}$ is low in highly porous media (low ϵ and σ) and for low frequencies. This situation is due to the low radiation efficiency and impedance mismatch for large wavelength. In the media, the transmission efficiency increases with frequency.

The transmission efficiency $S_{21}$ decreases with frequency in very conductive media. This situation is due to the attenuation in the medium.

Thus, an optimum frequency may be found between 500 MHz and 2 GHz.

It is also to be noted that, despite of the small size of the receiver antenna, the minimum attenuation allowed being −130 dB, transmission efficiency is not really an issue whatever the media electromagnetic properties.

Figure 12:
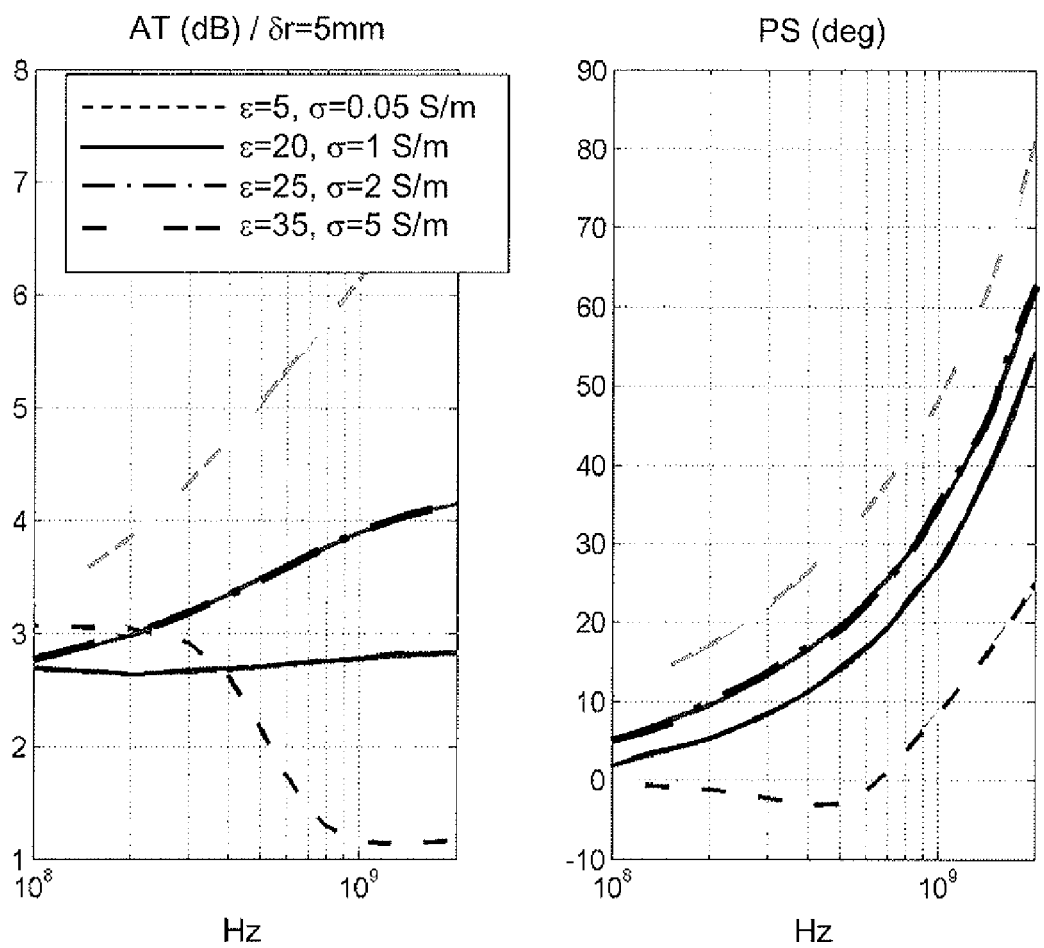
FIG. 12 illustrates the attenuation AT (left-hand curves) and phase shift PS (right-hand curves) versus the frequency for different typical media.

FIG. 12 illustrates the attenuation AT (left-hand curves) and phase shift PS (right-hand curves) versus the frequency for different typical media for a spacing of $r_1$=40 mm and $r_2$=45 mm.

From the equation that links the attenuation AT and phase shift PS to the wave number k and to the spacing $r_1$-$r_2$ given by:

$$AT - jPS = 3\ln\left(\frac{r_2}{r_1}\right) + jk(r_1 - r_2) - \ln\left(\frac{1-jkr_2-k^2r_2^2}{1-jkr_1-k^2r_1^2}\right),$$

the attenuation AT and phase-shift PS, between two receiver antenna, for different media, and versus frequency can be predicted.

The more the frequency is increased, the more the sensitivity is increased. At a frequency of 100 MHz, the phase-shift PS range is around 10 deg, while at a frequency of 2 GHZ, the phase-shift PS range is around 55 deg.

A similar behavior can be observed for the attenuation AT.

Final Remarks

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. An apparatus for investigating a geological formation surrounding a borehole, comprising:
    a logging tool moveable through the borehole,
    an electromagnetic probe comprising a pad mounted on the logging tool for engagement with the borehole by a wall-engaging face of the pad,
    at least one pair of transmitting antennas, each pair of the at least one pair of transmitting antennas comprises a first antenna and a second antenna mounted in the wall-engaging face,
    a plurality of spaced receiving antennas mounted in the wall-engaging face spaced in relation to the at least one pair of transmitting antennas, and
    wherein each of the antennas is an open-ended antenna forming a substantially pure electric dipole normal to the pad face, and wherein the first transmitting antenna of the at least one pair of transmitting antennas is positioned above the plurality of spaced receiving antennas and the second transmitting antenna of the at least one pair of transmitting antennas is positioned below the plurality of spaced receiving antennas.

2. The apparatus according to claim 1, wherein the open-ended antenna is a coaxial open-ended antenna substantially perpendicular to the wall-engaging face of the pad.

3. The apparatus according to claim 1, wherein the open-ended coaxial antenna comprises an inner and outer conductors separated by a dielectric material, the antenna being embedded in the pad.

4. The apparatus according to claim 1, wherein the outer conductor is formed by the wall-engaging face of the pad, said wall-engaging face being made of a conductive material.

5. The apparatus according to claim 1, wherein each of the antennas is positioned along a single line, and the first transmitting antenna and the second transmitting antenna are positioned symmetrically above and below the plurality of spaced receiving antennas along the line.

6. The apparatus according to claim 1, wherein the apparatus further comprises two lines of receiving antennas and two lines of transmitting antennas, the two lines of receiving antennas being approximately disposed in the middle of the metallic pad, the two lines of transmitting antennas being positioned symmetrically above and below the receivers lines at determined distances, all the lines being substantially parallel to each other.

7. The apparatus according to claim 1, wherein the apparatus further comprises a first set of reflection transmitting antenna positioned between the first transmitter line and the first receiver line and a second set of reflection transmitting antenna positioned between the second transmitter line and the second receiver line, each set comprising at least one transmitting antenna.

8. The apparatus according to claim 1, wherein the aperture of the transmitting antennas is larger than the aperture of the receiving antennas.

9. The apparatus according to claim 1, wherein at least a first and a second open-ended coaxial antenna have different diameters.

10. The apparatus according to claim 1, wherein the first line of receiving antennas is laterally shifted relatively to the second line of receiving antennas so as to define a "zig-zag" configuration of receiving antennas.

11. The apparatus according to claim 1, wherein the apparatus further comprises:
  a transmitter module adapted for energizing the transmitting antenna to transmit electromagnetic wave into the formations at a determined frequency, the transmitter module comprising a low frequency oscillator coupled to a IQ modulator,
  a receiver module adapted for receiving and processing an output signal at each of the receiving antennas representative of electromagnetic wave received from the formations, the receiver module comprising a mixer, and
  a master oscillator delivering a high frequency signal to the IQ modulator of the transmitter module and to the mixer of the receiver module.

12. The apparatus according to claim 11, wherein the master oscillator delivers a determined frequency ranging between 10 MHz and 10 GHz.

13. An electromagnetic method of logging geological formations surrounding a borehole using an apparatus according to any one of the claims 1 to 12, wherein the method comprises the steps of:
  a) running the apparatus through the borehole and engaging a pad with a borehole wall so as to define a selected zone made of a medium to be investigated,
  b) performing a first set of measurements at a deep radial depth of investigation in the selected zone by:
    b1) operating transmitting and receiving antennas so that each antenna defines a substantially pure electric dipole normal to the pad face, and radiating electromagnetic signals in the medium,
    b2) measuring a first set of attenuation and phase shift of the electromagnetic signals having traveled in the medium between the transmitting and receiving antennas,
  c) performing a second set of measurements at a shallow radial depth of investigation in the selected zone by:
    c1) operating transmitting and receiving antennas so as each antenna defines a substantially pure electric dipole normal to the pad face, and radiating electromagnetic signals in the medium,
    c2) measuring a second set of magnitude and phase of the electromagnetic signals reflected by the formation at the reflection antennas, and
  d) performing an inversion calculation based on the first and second set of measurements and determining the permittivity $\epsilon$ and the conductivity $\sigma$ of the geological formation in the selected zone.

14. The method of investigation according to claim 13, wherein the method further comprises performing reflection measurements at a deep depth of investigation and a shallow radial depth of investigation in the selected zone.

15. The method of investigation according to claim 13, wherein the medium comprises a geological formation covered by a mudcake layer, and the step d) comprises performing an inversion calculation based on the first and second set of measurements and determining the permittivity c, the conductivity $\sigma$ and thickness h of the mudcake layer, and the permittivity $\epsilon$ and the conductivity $\sigma$ of the geological formation in the selected zone.

16. The method of investigation according to claim 13, wherein the method further comprises forming an image of the selected zone of the geological formation based on the inversion calculation.

* * * * *